United States Patent
Han et al.

(10) Patent No.: US 10,127,455 B2
(45) Date of Patent: Nov. 13, 2018

(54) APPARATUS AND METHOD OF PROVIDING THUMBNAIL IMAGE OF MOVING PICTURE

(71) Applicant: Samsung Electronics Co., Ltd., Suwon-si, Gyeonggi-do (KR)

(72) Inventors: Kyu-chun Han, Seoul (KR); Sung-hoon Kim, Suwon-si (KR); Su-jin Ryu, Suwon-si (KR); Dong-jin Jung, Seoul (KR); Jun-kwon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 14/679,248

(22) Filed: Apr. 6, 2015

(65) Prior Publication Data
US 2015/0356356 A1 Dec. 10, 2015

(30) Foreign Application Priority Data
Jun. 9, 2014 (KR) .................. 10-2014-0069572

(51) Int. Cl.
*H04N 9/80* (2006.01)
*G06K 9/00* (2006.01)
(Continued)

(52) U.S. Cl.
CPC ..... *G06K 9/00751* (2013.01); *G06F 17/3084* (2013.01); *G11B 27/34* (2013.01)

(58) Field of Classification Search
CPC ........... H04N 1/00453; H04N 1/00442; H04N 2201/325; G06F 17/3028
(Continued)

(56) References Cited

U.S. PATENT DOCUMENTS

2007/0110399 A1 5/2007 Roh
2008/0260255 A1* 10/2008 Fukushima ....... G06F 17/30259
382/190
(Continued)

FOREIGN PATENT DOCUMENTS

| JP | 2004-254065 A | 9/2004 |
| KR | 10-2007-0052554 A | 5/2007 |
| KR | 10-2008-0096181 A | 10/2008 |

OTHER PUBLICATIONS

Chunxi Liu et al, Query sensitive dynamic web video thumbnail generation, Image Processing (ICIP). 2011 18th IEEE International Conference on, IEEE, Sep. 11, 2011, pp. 2449-2452, XP032080161, ISBN: 978-1-4577-1304-0.
(Continued)

*Primary Examiner* — Nigar Chowdhury
(74) *Attorney, Agent, or Firm* — Jefferson IP Law, LLP

(57) ABSTRACT

An electronic apparatus is provided. The electronic apparatus includes a processing unit configured to extract at least one frame selected from a plurality of frames of moving-picture data as a candidate thumbnail image, wherein the at least one frame corresponds to at least one frame selected according to a plurality of thumbnail extraction criteria, and to determine at least one candidate thumbnail image selected from a group comprising candidate thumbnail images obtained by the extracting, as at least one final thumbnail image, based on a thumbnail extraction criterion to which the candidate thumbnail images obtained by the extracting respectively correspond, and a display unit configured to display the at least one final thumbnail image.

19 Claims, 14 Drawing Sheets

(51) Int. Cl.
*G11B 27/34* (2006.01)
*G06F 17/30* (2006.01)

(58) Field of Classification Search
USPC .................................................. 386/241, 248
See application file for complete search history.

(56) References Cited

U.S. PATENT DOCUMENTS

| | | | |
|---|---|---|---|
| 2008/0267576 A1 | 10/2008 | Seo | |
| 2008/0279425 A1* | 11/2008 | Tang | G06K 9/00221 382/118 |
| 2009/0080020 A1* | 3/2009 | Kitagawa | H04N 5/85 358/1.15 |
| 2009/0087037 A1* | 4/2009 | Wada | G06F 17/30793 382/118 |
| 2009/0089712 A1* | 4/2009 | Sato | G06F 3/0482 715/838 |
| 2009/0089822 A1* | 4/2009 | Wada | G06F 17/30781 725/10 |
| 2009/0310931 A1* | 12/2009 | Nishiura | G11B 27/105 386/279 |
| 2010/0026842 A1* | 2/2010 | Ishizaka | G06F 17/30781 348/231.2 |
| 2010/0104144 A1* | 4/2010 | Momosaki | G06F 17/30256 382/118 |
| 2010/0104145 A1* | 4/2010 | Momosaki | G06F 17/30247 382/118 |
| 2010/0104146 A1* | 4/2010 | Momosaki | G06F 17/30781 382/118 |
| 2010/0123816 A1* | 5/2010 | Koh | G06F 17/30781 348/333.05 |
| 2012/0079380 A1* | 3/2012 | Tsai | G06F 17/30017 715/716 |
| 2012/0301106 A1 | 11/2012 | Johansson et al. | |
| 2013/0022244 A1* | 1/2013 | Nagata | G06F 17/30256 382/103 |
| 2013/0195426 A1* | 8/2013 | Kamotani | H04N 9/79 386/241 |

OTHER PUBLICATIONS

Konstantinos Chorianopoulos, User-based key frame detection in social web video, Apr. 9, 2012, XP55217290.
Yiqing Liang et al, A Practical Digital Video Database Based on Language and Image Analysis, Oct. 1, 1997, pp. 24-48, XP55217293.
Yuli Gao et al: "Thematic video thumbnail selection", Image Processing (ICIP), 2009 16th IEEE International Conference on, IEEE, Piscataway, NJ, USA, Nov. 7, 2009 (Nov. 7, 2009), pp. 4333-4336, XP031632184, ISBN: 978-1-4244-5653-6.

\* cited by examiner

| SCENE | Hit Rate |
|---|---|
| SCENE SHIFT DETECTION | 2 |
| FACE DETECTION | 2 |
| FACE RECOGNITION | 1 |

FIG. 9

| SCENE | Hit Rate |
|---|---|
| FIRST FRAME | 1 |
| SCENE SHIFT DETECTION | 10 |
| FACE DETECTION | 1 |
| FACE RECOGNITION | 0 |

FIG. 10

| SCENE | Hit Rate |
|---|---|
| FIRST FRAME | 1 |
| SCENE SHIFT DETECTION | 10 |
| FACE DETECTION | 10 |
| FACE RECOGNITION | 2 |

| SCENE | Hit Rate |
|---|---|
| FIRST FRAME | 1 |
| SCENE SHIFT DETECTION | 30 |
| FACE DETECTION | 15 |
| FACE RECOGNITION | 4 |

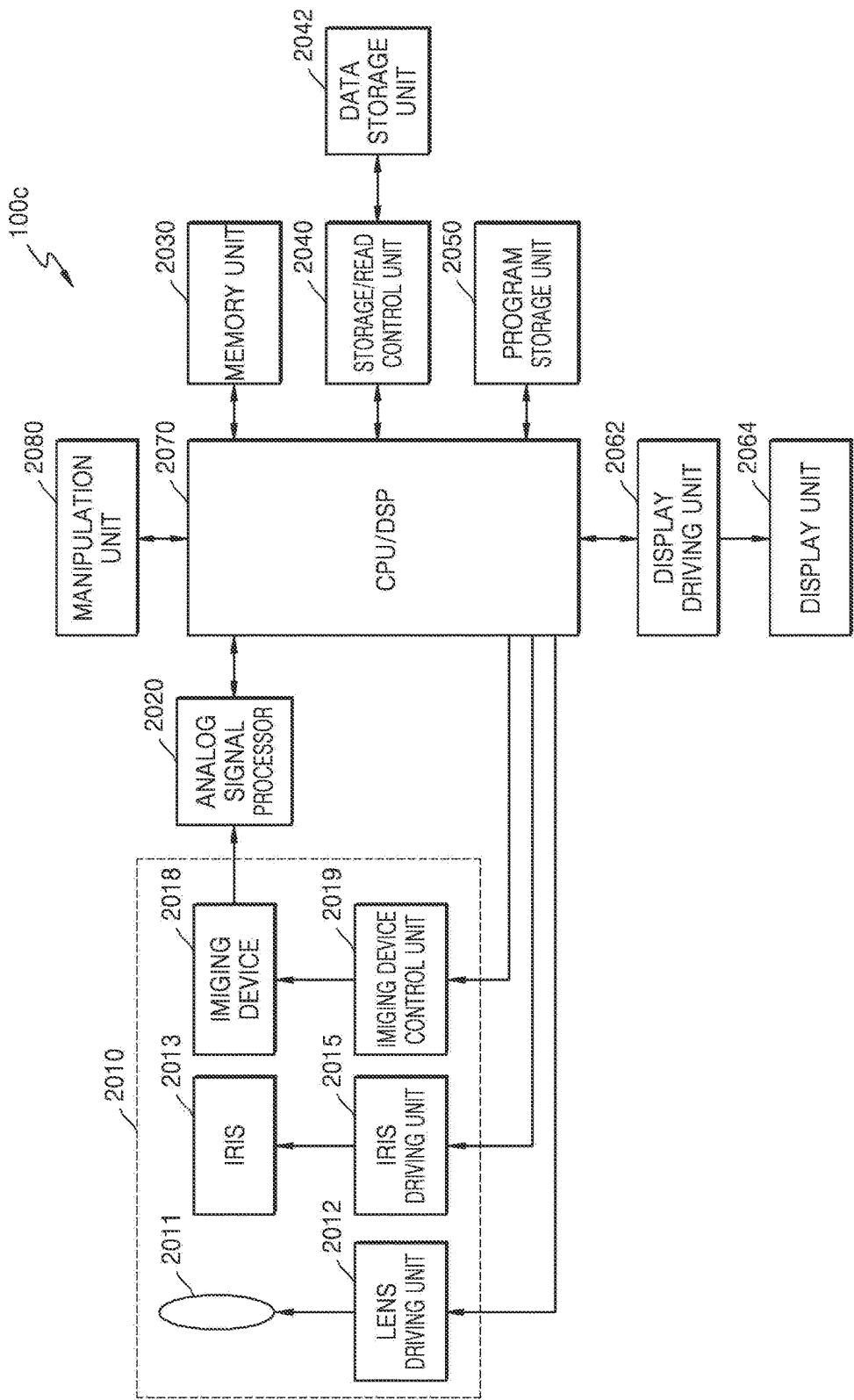

APPARATUS AND METHOD OF PROVIDING THUMBNAIL IMAGE OF MOVING PICTURE

CROSS-REFERENCE TO RELATED APPLICATION(S)

This application claims the benefit under 35 U.S.C. § 119(a) of a Korean patent application filed on Jun. 9, 2014 in the Korean Intellectual Property Office and assigned Serial number 10-2014-0069572, the entire disclosure of which is hereby incorporated by reference.

TECHNICAL FIELD

The present disclosure relates to an electronic apparatus for providing a thumbnail of a moving picture, an image processing method, and a non-transitory computer-readable storage medium storing instructions that, when executed, cause at least one processor to perform the image processing method.

BACKGROUND

In order to increase the performance of photography related functions, various electronic apparatuses that may photograph a moving picture are being developed. Since a moving image is obtained by consecutively recording a motion of a subject, a user may vividly photograph a scene that the user wants by using a moving-picture photographing method. However, since a moving picture has a larger amount of data as compared to a still image and is played for a certain period of time, a user may have difficulty in finding a desired scene in the moving picture.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of providing a thumbnail image of moving-picture data.

Another aspect of the present disclosure is to provide a method of conveniently reproducing a desired scene of moving-picture data, which is performed by a user.

Additional aspects will be set forth in part in the description which follows and, in part, will be apparent from the description, or may be learned by practicing the presented embodiments of the present disclosure.

In accordance with an aspect of the present disclosure, an electronic apparatus is provided. The electronic apparatus includes a processing unit configured to extract at least one frame selected from a plurality of frames of moving-picture data as a candidate thumbnail image, wherein the at least one frame corresponds to at least one frame selected according to a plurality of thumbnail extraction criteria, and determining at least one candidate thumbnail image selected from a group comprising candidate thumbnail images obtained by the extracting, as at least one final thumbnail image, based on account a thumbnail extraction criterion to which the candidate thumbnail images obtained by the extracting respectively correspond, and a display unit configured to display the at least one final thumbnail image.

In accordance with an aspect of the present disclosure, the plurality of thumbnail extraction criteria may include at least one selected from a group comprising a case when a scene shift, in which a scene is changed from a previous frame to a current frame in correspondence with a value equal to or greater than a reference value, is detected, a case when a face is detected, and a case when a registered face is recognized, or a combination thereof.

In accordance with an aspect of the present disclosure, the processing unit is further configured to determine the at least one final thumbnail image, by providing a first priority to the case when the registered face is recognized and providing a second priority to the case when the face is detected.

In accordance with an aspect of the present disclosure, the processing unit is further configured to determine the at least one final thumbnail image, by providing a third priority to a thumbnail extraction criterion to which a greatest number of the candidate thumbnail images obtained by the extracting correspond.

In accordance with an aspect of the present disclosure, the electronic apparatus may further include a storage unit configured to store at least one piece of contact information, and a face image relating to the at least one piece of contact information, wherein the registered face includes a face image related to the at least one piece of contact information.

In accordance with an aspect of the present disclosure, the case when the scene shift is detected may be at least one selected from a group comprising a case when a change between frames corresponds to a value equal to or greater than the reference value, a case when a new object is detected, and a case when a photographing condition is changed in correspondence with the value equal to or greater than the reference value, or a combination thereof.

In accordance with an aspect of the present disclosure, the processing unit is further configured to determine a number of the at least one final thumbnail image, based on a time length of the moving-image data and a number of the candidate thumbnail images obtained by the extracting.

In accordance with an aspect of the present disclosure, the processing unit is further configured to determine that the at least one final thumbnail image includes an image corresponding to a first frame of the moving-picture data.

In accordance with an aspect of the present disclosure, the electronic apparatus may further include a user input unit configured to receive a user selection of selecting one of the displayed at least one final thumbnail image, wherein the processing unit is further configured to reproduce the moving-picture data, the reproducing of the moving-picture data starting from a frame corresponding to the selected at least one final thumbnail image, if the one of the displayed at least one final thumbnail image is selected.

In accordance with an aspect of the present disclosure, the electronic apparatus may further include a storage unit configured to store the moving-picture data, wherein the processing unit is further configured to generate and store a moving-picture file that includes the moving-picture data and the at least one final thumbnail image in the storage unit.

In accordance with another aspect of the present disclosure, an image processing method is provided. The image processing method includes extracting, by a processing unit, at least one frame selected from a plurality of frames of moving-picture data as a candidate thumbnail image, wherein the at least one frame corresponds to at least one frame selected from a plurality of thumbnail extraction criteria, determining, by the processing unit, that at least one final thumbnail image selected from candidate thumbnail images obtained by the extracting, is obtained by the extracting, based on a thumbnail extraction criterion to which the candidate thumbnail images obtained by the extracting respectively correspond, and displaying the at least one final thumbnail image.

In accordance with an aspect of the present disclosure, the plurality of thumbnail extraction criteria may include at least one selected from a group comprising a case when a scene shift, in which a scene is changed from a previous frame to a current frame in correspondence with a value equal to or greater than a reference value, is detected, a case when a face is detected, and a case when a registered face is recognized, or a combination thereof.

In accordance with an aspect of the present disclosure, in the determining of the at least one final thumbnail image, the processing unit may determine the at least one final thumbnail image, by providing a first priority to the case when the registered face is recognized and providing a second priority to the case when the face is detected.

In accordance with an aspect of the present disclosure, in the determining of the at least one final thumbnail image, the processing unit may determine the at least one final thumbnail image, by providing a third priority to a thumbnail extraction criterion to which a greatest number of the candidate thumbnail images obtained by the extracting correspond.

In accordance with an aspect of the present disclosure, the registered face may include a face image that is related to and stored in contact information that is stored in an electronic apparatus for performing the image processing method.

In accordance with an aspect of the present disclosure, the case when the scene shift is detected may be at least one selected from a group comprising a case when a change between frames corresponds to a value equal to or greater than the reference value, a case when a new object is detected, and a case when a photographing condition is changed in correspondence with the value equal to or greater than the reference value, or a combination thereof.

In accordance with an aspect of the present disclosure, the image processing method may further include determining a number of the at least one final thumbnail image, based on a time length of the moving-image data and a number of the candidate thumbnail images obtained by the extracting.

In accordance with an aspect of the present disclosure, the determining of the at least one final thumbnail image includes determining that the at least one final thumbnail image includes an image corresponding to a first frame of the moving-picture data.

In accordance with an aspect of the present disclosure, the image processing method may further include reproducing the moving-picture data, the reproducing of the moving-picture data starting from a frame corresponding to the selected at least one final thumbnail image, if the one of the displayed at least one final thumbnail image is selected.

In accordance with another aspect of the present disclosure, a non-transitory computer-readable storage medium is provided. The non-transitory computer-readable storage medium storing instructions that, when executed, cause at least one processor to perform a method including extracting, by a processing unit, at least one frame selected from a plurality of frames of moving-picture data as a candidate thumbnail image, wherein the at least one frame corresponds to at least one frame selected from a plurality of thumbnail extraction criteria, determining, by the processing unit, that at least one final thumbnail image selected from candidate thumbnail images obtained by the extracting, is obtained by the extracting, based on a thumbnail extraction criterion to which the candidate thumbnail images obtained by the extracting respectively correspond, and displaying the at least one final thumbnail image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 illustrates a hit-rate table according to an embodiment of the present disclosure;

FIG. 10 illustrates a hit-rate table according to an embodiment of the present disclosure;

FIG. 20 illustrates a diagram of a structure of an electronic apparatus according to an embodiment of the present disclosure.

Throughout the drawings, it should be noted that like reference numbers are used to depict the same or similar elements, features, and structures.

DETAILED DESCRIPTION

Figure 1:
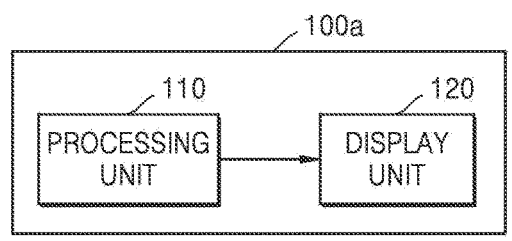
FIG. 1 illustrates a structure of an electronic apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

General and widely-used terms have been employed herein, in consideration of functions provided in the present disclosure, and may vary according to an intention of one of ordinary skill in the art, a precedent, or emergence of new technologies. Additionally, in some cases, an applicant may arbitrarily select specific terms. Then, the applicant will provide the meaning of the terms in the description of the inventive concept. Accordingly, it will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, the term "unit" means software or hardware components such as field programmable gate array (FPGA) or application-specific integrated circuit (ASIC), and a "unit" performs some functions. However, a "unit" is not limited to hardware or software. A "unit" may be configured to be included in a storage medium that may be addressed, or configured to play one or more processors. Accordingly, as an example, a "unit" includes components such as software components, object-oriented software components, class components, or task components, processes, functions, attributes, procedures, subroutines, segments of a program code, drivers, firmware, micro-codes, circuits, data, database, data structures, tables, arrays, or variables. Functions provided in components or "units" may be combined into a small number of components or "units," or separated into additional components or "units."

The present disclosure will now be described more fully with reference to the accompanying drawings, in which various embodiments of the present disclosure are shown. In the description of the present disclosure, certain detailed explanations of the related art are omitted when it is deemed that they may unnecessarily obscure the essence of the present disclosure.

Specifically, FIGS. 1 through 20, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a structure of an electronic apparatus according to an embodiment of the present disclosure.

Referring to FIG. 1, an electronic apparatus 100a is illustrated, where the electronic apparatus 100a includes a processing unit 110 and a display unit 120.

The processing unit 110 receives an input of moving-picture data, and determines at least one final thumbnail image based on the moving-picture data.

The moving-picture data includes a plurality of frames. The moving-picture data may be, for example, data of a moving picture photographed by the electronic apparatus 100a, moving-picture data stored in the electronic apparatus 100a, or moving-picture data input by another electronic apparatus 100a or via a network. The moving-picture data may be in a format such as audio visual interleave (AVI), moving picture experts group (MPEG), high-efficiency video coding (HEVC), Windows media video (WMV), a quick time movie (MOV), and an advanced streaming format (ASF).

The processing unit 110 extracts at least one candidate thumbnail image selected from a group consisting of the plurality of frames included in the moving-picture data, by using a plurality of thumbnail extraction criteria. The processing unit 110 may extract a frame, which meets at least one selected from a group consisting of the plurality of thumbnail extraction criteria, from among the plurality of frames of the moving-picture data as a candidate thumbnail image.

The plurality of thumbnail extraction criteria may include, for example, a case when a scene shift, in which a scene is changed from a previous frame to a current frame in correspondence with a value equal to or greater than a reference value, is detected, a case when a face is detected, and/or a case when a registered face is recognized.

According to an embodiment of the present disclosure, a scene shift, in which a scene is changed from a previous frame to a current frame in correspondence with a value equal to or greater than a reference value, is detected, for example, by using a difference image between the current frame and the previous frame. For example, if a sum of pixel values of the difference image is equal to or higher than a reference value, it may be determined that a scene shift is present. As another example, if a number of pixels whose pixel value is equal to or higher than a reference value, from among pixels of the difference image, is equal to or higher than a reference number, it may be determined that a scene shift is present. If a photographing condition is changed for a reference value in an automatic photographing mode, it may be determined that there is a scene shift.

A face may be detected using various face detection algorithms. The face detection algorithms may include, for example, a neural algorithm, an Adaboost algorithm, or a support vector machine.

A registered face may be recognized using various face recognition algorithms. The electronic apparatus 100a may store information about at least one face in a storage unit (not illustrated) so as to recognize a face. The information about at least one face may be, for example, a face feature point information.

If the frame meets just one from among the plurality of thumbnail extraction criteria, the processing unit 110 determines the frame as a candidate thumbnail image.

According to an embodiment of the present disclosure, the processing unit 110 determines whether each frame meets at least one of the plurality of thumbnail extraction criteria.

According to an embodiment of the present disclosure, the processing unit 110 determines whether a frame located at a certain frame interval meets at least one of the plurality of thumbnail extraction criteria. For example, the processing unit 110 determines whether a frame for every 10 frames meets at least one of the plurality of thumbnail extraction criteria. In the current embodiment, a previous frame which is a reference for detecting a scene shift is a frame to which the plurality of thumbnail extraction criteria are applied before the plurality of thumbnail extraction criteria are applied to a current frame. For example, if it is determined whether a frame for every 10 frames corresponds to the plurality of thumbnail extraction criteria, a previous frame is located 10 frames before a current frame.

When the candidate thumbnail image is determined, the processing unit 110 determines at least one final thumbnail image selected from a group consisting of the extracted candidate thumbnail images, by taking into account a thumbnail extraction criterion to which the extracted candidate thumbnail image corresponds. If the number of the extracted at least one candidate thumbnail images amounts to a certain value, the processing unit 110 determines whether to determine the extracted at least candidate thumbnail images as a final thumbnail image, by taking into account a thumbnail extraction criterion to which each candidate thumbnail image corresponds. For example, the processing unit 110 selects a candidate thumbnail image in which a registered face is recognized as a final thumbnail image as a first priority, selects a candidate thumbnail image in which a face is detected as a final thumbnail image as a second priority, and selects a candidate thumbnail image in which a scene shift is detected as a final thumbnail image as a third priority.

The candidate thumbnail image is not actually displayed, and the final thumbnail image is displayed. A user may select moving-picture data by using the final thumbnail image or select a point of time at which moving-picture data starts to be reproduced.

The display unit 120 displays at least one final thumbnail image. The at least one final thumbnail image may be displayed in the form, which may be selected by the user, on the display unit 120. For example, the at least one final thumbnail image may be displayed in a graphic user interface (GUI) form for playing a moving picture.

The electronic apparatus 100a may be implemented in the form of, for example, a camera, a smartphone, a cellular phone, a tablet personal computer (PC), a notebook, a wearable apparatus, a television (TV), and/or a PC.

Figure 2:
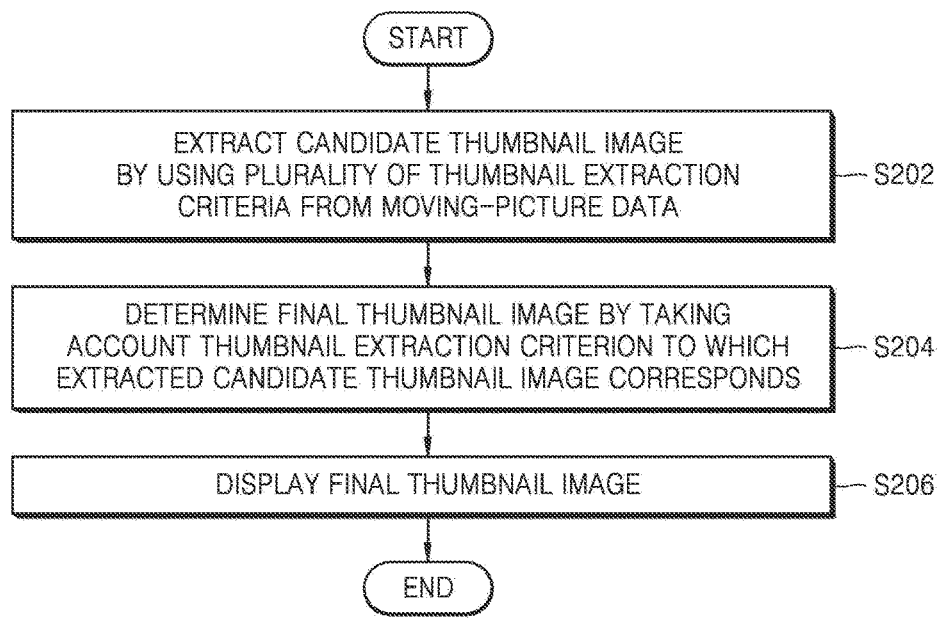
FIG. 2 is a flowchart of an image processing method according to an embodiment of the present disclosure.

FIG. 2 is a flowchart of an image processing method according to an embodiment of the present disclosure.

Referring to FIG. 2, a flowchart is illustrated, according to which an image processing method may be performed, for example, by using the electronic apparatus 100a shown in FIG. 1. In the description of the specification, an embodiment of the present disclosure in which the image processing method is performed by the electronic apparatus 100a is mainly described. However, the various embodiments herein are not limited thereto, and the image processing method may be performed by using various forms of electronic apparatuses.

Referring to FIG. 2, in operation S202, the processing unit 110 extracts a candidate thumbnail image by using a plurality of thumbnail extraction criteria from, for example, moving-picture data. The plurality of thumbnail extraction criteria may include, for example, a case when a scene shift, in which a scene is changed from a previous frame to a current frame in correspondence with a value equal to or greater than a reference value, is detected, a case when a face is detected, and/or a case when a registered face is recognized.

If the candidate thumbnail image is extracted in operation S202, the processing unit 110 determines a final thumbnail image by taking into account a thumbnail extraction criterion to which the extracted candidate thumbnail image corresponds, in operation S204. For example, the processing unit 110 selects a candidate thumbnail image, in which a registered face is recognized, as a final thumbnail image as a first priority, selects a candidate thumbnail image, in which a face is detected, as a final thumbnail image as a second priority, and selects a candidate thumbnail image, in which a scene shift is detected, as a final thumbnail image as a third priority.

Then, in operation S206, the display unit 120 displays the final thumbnail image.

Figure 3:
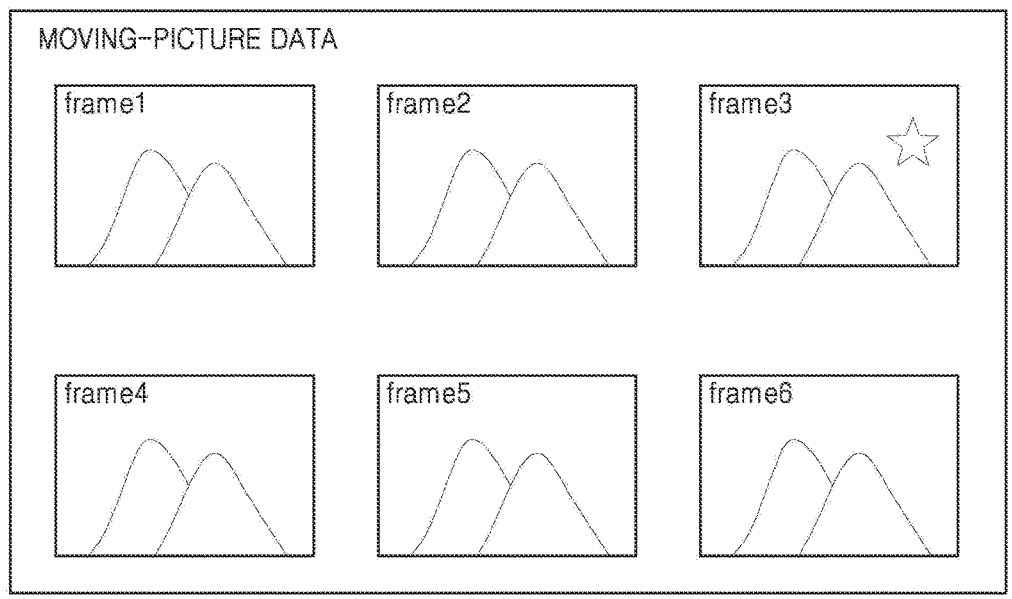
FIG. 3 illustrates a diagram for explaining a method of detecting a scene shift according to an embodiment of the present disclosure.

FIG. 3 illustrates a diagram for explaining a method of detecting a scene shift according to an embodiment of the present disclosure.

According to an embodiment of the present disclosure, if a new object that was not detected in a previous frame is detected, the processing unit 110, as illustrated in FIG. 1, determines that there is a scene shift.

Referring to FIG. 3, a diagram is illustrated to explain that, when moving-picture data includes frame 1, frame 2, frame 3, frame 4, frame 5, and frame 6, and if frames 1 and 2 do not include a star and a star is detected in frame 3, the processing unit 110 determines that there is a scene shift in frame 3 in which a new object is detected, and determines frame 3 as a candidate thumbnail image. Then, after the star is detected in frame 3, if the star disappears in frame 4, the processing unit 110 determines that there is a scene shift in frame 4, and determines frame 4 as a candidate thumbnail image.

According to an embodiment of the present disclosure, it may be determined whether a new object appears or whether an existing object disappears, by using an object recognition algorithm.

According to an embodiment of the present disclosure, it may be determined whether a new object appears or whether an existing object disappears, by using a pixel value of a difference image. For example, if a change in a pixel value of a particular area in correspondence with a value equal to or greater than a reference value is shown in a difference image, the processing unit 110 may determine that a new object appears or that an existing object disappears, FIG. 4 is a diagram for explaining a method of detecting a scene shift according to an embodiment of the present disclosure.

Figure 4:
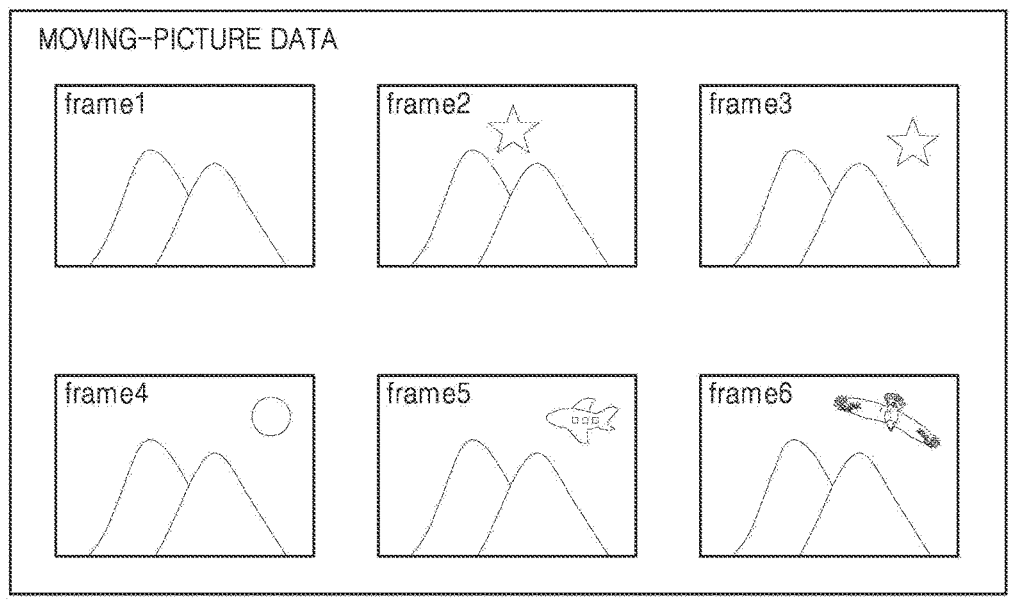
FIG. 4 illustrates a diagram for explaining a method of detecting a scene shift according to an embodiment of the present disclosure.

Referring to FIG. 4, a diagram is illustrated to explain that, if a particular object is moved for a distance equal to or greater than a reference distance, the processing unit 110, as illustrated in FIG. 1, may determine that there is a scene shift. For example, when frames 2 and 3 shown in FIG. 4 are compared to each other, a star is moved for a distance equal to or greater than a reference distance. In this case, the processing unit 110 may determine that there is a scene shift. Moving of an object may be detected by using, for example, a motion vector, a difference image, object recognition, or object tracking. When a motion vector is used, if a size of the motion vector is equal to or greater than a reference value, it may be determined that there is a scene shift.

When a difference image is used, if two areas, in which a pixel value is equal to or greater than a reference value, are present and have a similar shape in the differential area, and if a distance between the two areas is equal to or greater than the reference value, it may be determined that there is a scene shift. Additionally, the processing unit 110 may determine that a scene shift is present if a value, obtained by using a method of object recognition or object tracking when an object is moved, is equal to or greater than a reference value, the processing unit 110 may determine that a scene shift is present.

Additionally, in the current embodiment of the present disclosure, if a different type of an object appears in a certain frame, it may be determined that there is a scene shift in the frame. For example, if a star appears in frame 3 and a moon appears in frame 4, the processing unit 110 may determine that there is a scene shift in frame 4 in which a new object has appeared, and determine frame 4 as a candidate thumbnail image.

Additionally, an object is detected respectively in frames 5 and 6, the processing unit 110 may determine that there is a scene shift respectively in frames 5 and 6, and determine frames 5 and 6 as a candidate thumbnail image. If a different type of object appears in a frame, the different type of the object may be detected by using object recognition or a difference image. For example, the processing unit 110 may recognize a type or shape of an object by using an object recognition algorithm, and thus, determine whether a new object is detected in each frame. As another example, if an area that has a pixel value equal to or greater than a reference value is newly detected in a difference image, or if an area that has a pixel value equal to or greater than a reference value and that includes a different shape between a previous frame and a current frame is newly detected in a difference image, the processing unit 110 may determine that a new object is detected.

Figure 5:
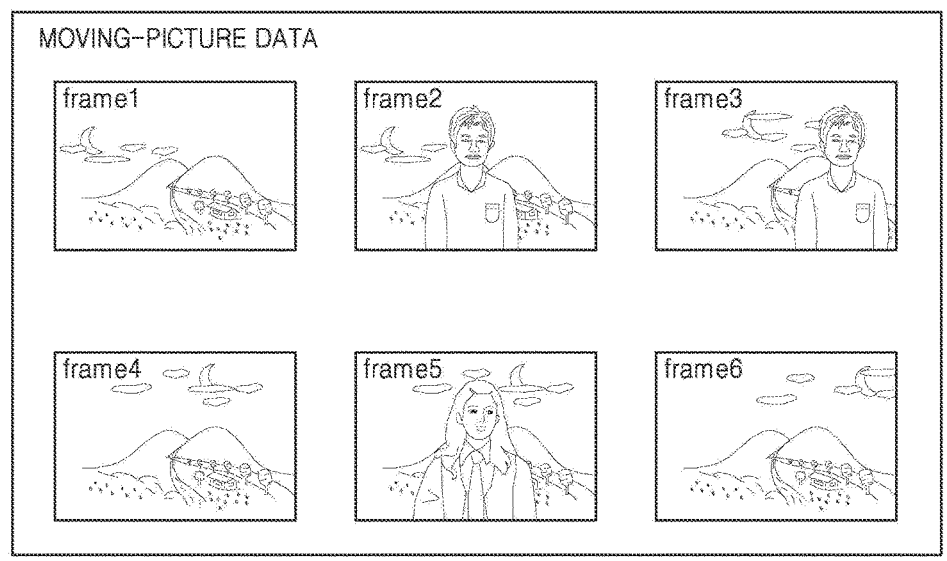
FIG. 5 illustrates a diagram for explaining a method of detecting a face according to an embodiment of the present disclosure.

FIG. 5 illustrates a diagram for explaining a method of detecting a face, according to an embodiment of the present disclosure.

Referring to FIG. 5, a diagram is illustrated to explain that, if a face is detected in a frame, the processing unit 110, as illustrated in FIG. 1, determines the frame as a candidate thumbnail image. For example, since a face is detected respectively from frames 2, 3, and 5 of frames 1-6, which are shown in FIG. 5, the processing unit 110 determines frames 2 and 5 as a candidate thumbnail image.

According to an embodiment of the present disclosure, if a face is newly detected, the processing unit 110 determines the frame as a candidate thumbnail image. For example, since a face is detected consecutively from frames 2 and 3, the processing unit 100 may not select frame 3 as a candidate thumbnail image. As another example, the processor 110 performs face recognition, and then, if a face detected in frame 2 and a face detected in frame 3 are the same person's face, the processing unit 110 may select frame 2 as a candidate thumbnail image, and may not select frame 3 as a candidate thumbnail image. If the face detected in frame 2 and the face detected in frame 3 are respectively a different person's face, the processing unit 110 may select both frames 2 and 3 as a candidate thumbnail image.

Additionally, the processing unit 110 determines whether the detected face is a registered face in a frame in which the face is detected. The registered face may be, for example, a face pre-registered by the user or a face stored in contact information.

Figure 6:
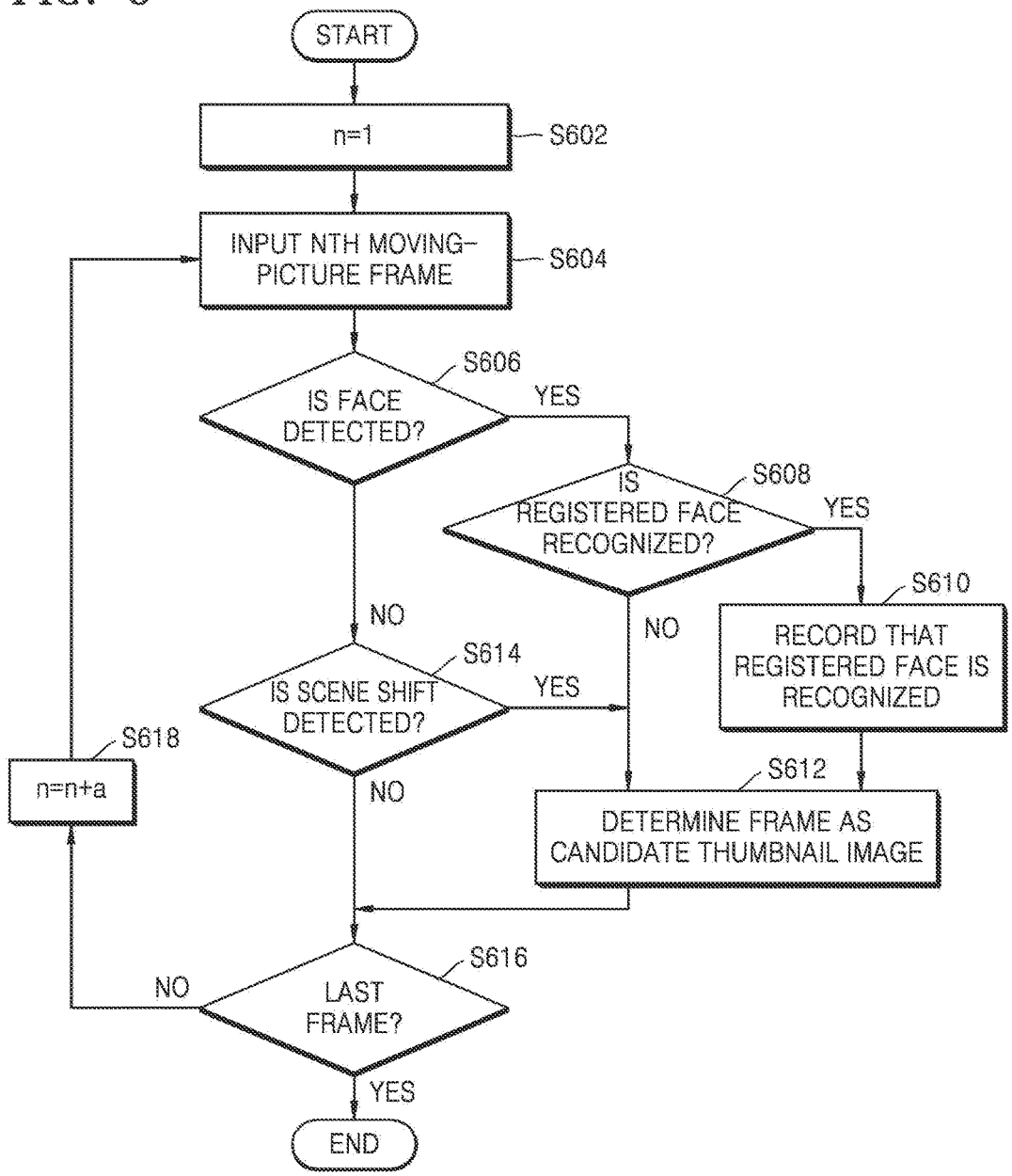
FIG. 6 illustrates a diagram for explaining a method of determining whether a frame included in moving-picture data corresponds to at least one selected from a group consisting of a plurality of thumbnail extraction criteria, according to an embodiment of the present disclosure.

FIG. 6 illustrates a diagram for explaining a method of determining whether a frame included in moving-picture data corresponds to at least one selected from a group consisting of a plurality of thumbnail extraction criteria, according to an embodiment of the present disclosure.

Referring to FIG. 6, a diagram is illustrated, which includes starting inputting from a first frame (e.g., n=1) in operation S602, such that a moving-picture frame is input to a certain module included in the processing unit 110, as illustrated in FIG. 1, for determining a plurality of thumbnail extraction criteria in operation S604. If a face is detected in the input moving-picture frame in operation S606, the processing unit 110 recognizes whether the detected face is a registered face in operation S608.

If the detected face is a registered face in operation S608, the processing unit 110 records the face detected in the frame as a registered face in a certain storage space in operation S610, and determines the frame as a candidate thumbnail image. The certain storage space may be, for example, a frame in which a registered face is detected, a management file for extracting a moving-picture thumbnail image, a management file for managing moving-picture data, or a temporary storage space included in the electronic apparatus 100a.

Even if the detected face is not a registered face in operation S608, the processing unit 110 determines the frame as a candidate thumbnail image in operation S612.

If a face is not detected in the moving-picture frame in operation S606, the processing unit 110 determines whether a scene shift is detected in the frame in operation S614. A scene shift may be detected by using a difference image, object recognition, and/or object tracking as described above.

If a scene shift is detected in operation S614, the frame is determined as a candidate thumbnail image in operation S612. If a scene shift is not detected in operation S614, the frame is not determined as a candidate thumbnail image and operation S616 is performed to determine whether the frame is a last frame. If the frame is not the last frame in operation S616, a determining of whether the frame corresponds to the plurality of thumbnail extraction criteria is performed on a next frame in operations S618 and S604. According to an embodiment of the present disclosure, the next frame may be a frame that is located directly next to the frame. In this case, "a" described with reference to operation 618, shown in FIG. 6, may have a value of 1. According to an embodiment of the present disclosure, the next frame may be a frame that is located a certain number of frames after the frame. In this case, "a" described with reference to operation 618, shown in FIG. 6, may have a value equal to or greater than 2. If operation S616 determines that the frame is the last frame, then the process ends.

Figures 7, 8:
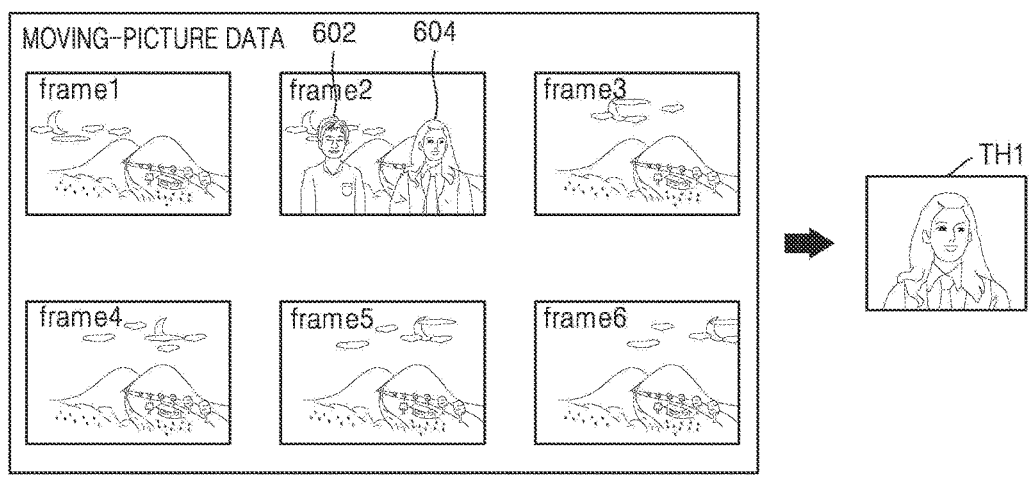
FIG. 7 illustrates a diagram for explaining an image processing method according to an embodiment of the present disclosure.
FIG. 8 illustrates a hit-rate table according to an embodiment of the present disclosure.

FIG. 7 illustrates a diagram for explaining an image processing method according to an embodiment of the present disclosure.

According to an embodiment of the present disclosure, if a registered face is detected in a frame, the processing unit 110, as illustrated in FIG. 1, may generate a candidate thumbnail image or a final thumbnail image, by cutting a moving-picture frame corresponding to the candidate thumbnail image or the final thumbnail image so that the registered face is located at a center of the moving-picture frame.

Referring to FIG. 7, a diagram is illustrated to explain that, if person 602 and person 604 are detected in frame 2, out of frames 1-6, and person 604 is a registered person, the processing unit 110 may generate a candidate thumbnail image or a final thumbnail image TH1, by cutting frame 2 so that person 604 is located at a center of the candidate thumbnail image or the final thumbnail image TH1.

According to an embodiment of the present disclosure, if a face is detected in a frame, the processing unit 110 may generate a candidate thumbnail image or a final thumbnail image, by cutting a moving-picture frame so that the detected face is located at a center of the candidate thumbnail image or the final thumbnail image. In this case, if a plurality of faces are detected and a registered person is present in a frame like frame 2, as shown in FIG. 7, the processing unit 110 may generate the candidate thumbnail image or the final thumbnail image, by cutting the moving-picture frame with a center at the registered person.

Alternatively, if a plurality of faces are detected and a registered person is not present in a frame, the processing unit 110 may generate a candidate thumbnail image or a final thumbnail image with a center having at least some faces selected from a group consisting of the plurality of faces, in consideration of a location or a size of the faces. As another example, if a plurality of faces are detected and a registered person is not present in a frame, the processing unit 110 may generate a candidate thumbnail image or a final thumbnail image by using a whole area of the frame.

FIG. 8 illustrates a hit-rate table according to an embodiment of the present disclosure.

Referring to FIG. 8 a hit-rate table storing information is illustrated. For example, when the processing unit 110, as illustrated in FIG. 1, stores a candidate thumbnail image, the processing unit 110 may store information about a thumbnail extraction criterion to which each candidate thumbnail image corresponds, as shown in FIG. 8.

For example, information may be stored to indicate whether a thumbnail extraction criterion to which each candidate thumbnail image corresponds is a case when a scene shift is detected, a case when a face is detected, and/or a case when a registered face is recognized. The information about the thumbnail extraction criterion may be stored, for example, in a frame in which a registered face is detected, a management file for extracting a moving-picture thumbnail image, a management file for managing moving-picture data, or a temporary storage space included in the electronic apparatus 100*a*, as illustrated in FIG. 1.

Additionally, referring to FIG. 8, the processing unit 110 calculates a hit rate of a candidate thumbnail image according to each thumbnail extraction criterion, and stores the hit rate in a certain storage space. For example, whenever a candidate thumbnail image that corresponds to a new thumbnail extraction criterion is detected, the processing unit 110 generates an item with respect to the thumbnail extraction criterion in the hit-rate table. Additionally, whenever a candidate thumbnail image is detected, the processing unit 110 may update a hit rate in the hit-rate table.

According to an embodiment of the present disclosure, the processing unit 110 determines a number of final thumbnail images according to a time length of moving-picture data. For example, the processing unit 110 determines a value corresponding to 50% of a total sum of hit rates in the hit-rate table as the number of final thumbnail images, with respect to moving-picture data having a time length less than 30 minutes. The processing unit 110 determines a value corresponding to 10% of a total sum of hit rates in the hit-rate table as the number of final thumbnail images, with respect to moving-picture data having a time length equal to or greater than 30 minutes.

According to an embodiment of the present disclosure, the number of the final thumbnail images may be preset. For example, the number of the final thumbnail images may be determined and set as a constant value, or determined and set according to a time length of moving-picture data.

According to an embodiment of the present disclosure, the processing unit 110 may determine a priority for selecting final thumbnail images, based on the hit-rate table. For example, a frame that includes a registered face may be set as a first priority, a frame in which a face is detected may be set as a second priority, and a candidate thumbnail image that corresponds to a thumbnail extraction criterion having a highest hit rate may be set as a third priority.

Additionally, according to an embodiment of the present disclosure, the processing unit 110 may change a priority of a frame in which a face is detected according to a hit rate in the hit-rate table. For example, if a hit rate of face detection compared to a total sum of hit rates included in the hit-rate table is equal to or less than 30%, the processing unit 100 may set face detection as a second priority. If a hit rate of face detection compared thereto is greater than 30%, the processing unit 110 may set face detection as the same priority as a priority of a thumbnail extraction criterion having a highest hit rate. In the current embodiment of the present disclosure, if a hit rate of face detection compared thereto is greater than 30%, a frame that includes a registered face is set as a first priority, and a candidate thumbnail image that corresponds to the frame in which the face is detected, and the final thumbnail image that corresponds to a thumbnail extraction criterion having a highest hit rate are set as a second priority.

According to an embodiment of the present disclosure, if a total sum of hit rates in the hit-rate table is equal to or less than the minimum number of thumbnail images, all candidate thumbnail images may be determined as final thumbnail images. For example, if the minimum number of thumbnail images is 10, since a total sum of hit rates in the hit-rate table is 5 according to an example shown in FIG. 8, all candidate thumbnail images may be determined as final thumbnail images.

According to an embodiment of the present disclosure, if the number of candidate thumbnail images, extracted from moving-picture data that has a time length equal to or greater than a reference time length, is less than the minimum number of thumbnail images, the processing unit 110 further extracts candidate thumbnail images from the moving-picture data so that the number of the candidate thumbnail images amounts to the minimum number of thumbnail images. According to an embodiment of the present disclosure, the processing unit 110 may further extract candidate thumbnail images from a section of the moving-picture data in which a time interval between candidate thumbnail images is long. For example, if three candidate thumbnail images are to be further extracted from the moving-picture data, the processing unit 110 may further extract a first candidate thumbnail image from a section of the moving-picture data in which a time interval is longest, further extract a second candidate thumbnail image from a section in which a time interval that includes the first candidate thumbnail image is longest, and further extract a third candidate thumbnail image from a section in which a time interval that includes the first candidate thumbnail image and the second candidate thumbnail image is longest.

According to an embodiment of the present disclosure, if a value obtained by applying a certain rate to a total sum of hit rates in the hit-rate table is less than the minimum number of thumbnail images, the processing unit 110 determines the number of the final thumbnail images as the minimum number of thumbnail images. For example, with respect to a moving picture having a time length equal to or greater than 30 minutes, if a total sum of the hit rates in the hit-rate table is 10 and the minimum number of thumbnail images is 7, a value obtained by applying 10% to the total sum of the hit rates is 1. In this case, the number of the final thumbnail images is determined as 7, and 7 candidate thumbnail images from among the 10 candidate thumbnail images are determined as the final thumbnail images.

According to an embodiment of the present disclosure, the processing unit 110 may always include a first frame included in the moving-picture data in the final thumbnail images of the moving-picture data.

FIG. 9 illustrates a hit-rate table according to an embodiment of the present disclosure.

Referring to FIG. 9, a hit-rate table is illustrated, where the hit-rate table is generated with respect to moving-picture data having a time length less than 30 minutes.

Regarding the hit-rate table of FIG. 9, the processing unit 110, as illustrated in FIG. 9, determines an initial scene corresponding to a first frame as a candidate thumbnail image. Then, the processing unit 110 extracts a candidate thumbnail image by applying thumbnail extraction criteria such as scene shift detection, face detection, and registered face detection to frames included in the moving-picture data, and thus, generates a hit-rate table.

Then, the processing unit 110 determines an initial scene as a final thumbnail image.

Additionally, since a hit rate of a scene shift is highest among the hit rates in the hit-rate table, the processing unit 110 sets a scene shift as a third priority. Since the number of face detection is equal to or less than a value amounting 30% (3.6) of a total sum of the hit rates in the hit-rate table, the processing unit 110 determines face detection as a second priority. Since a time length of the moving-picture data is less than 30 minutes, the number of the final thumbnail images is determined as 6, which is 50% of the total sum of hit rates (i.e., 12) in the hit-rate table.

The processing unit 110 determines an initial scene as a final thumbnail image. Since a frame in which a registered face is recognized is not present, a frame in which a face is recognized is determined as a final thumbnail image, and 4 frames in which a scene shift is detected is determined as final thumbnail images. In order to select 4 frames from among 10 frames in which a scene shift is detected, the processing unit 110 may take into account, for example, a time interval between candidate thumbnail images or an evaluation value obtained by evaluating a scene shift. For example, the processing unit 110 may determine a candidate thumbnail image as a final thumbnail image as a priority, wherein at least one selected from a group consisting of a time interval between the candidate thumbnail image and a previous candidate thumbnail image and a time interval between the candidate thumbnail image and a next candidate thumbnail image is longest from among candidate thumbnail images. As another example, the processing unit 110 may determine a final thumbnail image according to an order from a largest evaluation value obtained by evaluating a scene shift. The evaluation value obtained by evaluating the scene shift may be, for example, a pixel value of a difference image or a size of a motion vector.

FIG. 10 illustrates a hit-rate table according to an embodiment of the present disclosure.

Referring to FIG. 10, a hit-rate table is illustrated, where the hit-rate table is generated with respect to moving-picture data having a time length less than 30 minutes.

Regarding the hit-rate table of FIG. 10, the processing unit 110, as illustrated in FIG. 1, determines a number of final thumbnail images as 11.5 which is 50% of 23, a total sum of hit rates in the hit-rate table. According to various embodiments of the present disclosure, if a value of 50% of the total sum of the hit rates has a decimal place, the processing unit 110 may determine the number of the final thumbnail images by rounding off, up, or down the decimal place. In the current embodiment, a case when the number of the final thumbnail images is determined as 11 by rounding down a decimal place is described as an example.

The processing unit 110 determines an initial scene as a final thumbnail image.

Additionally, the processing unit 110 determines two candidate thumbnail images in which a face is recognized, which are determined as first priorities, as final thumbnail images.

Since a hit rate of face detection is a value equal to or greater than 6.9 which amounts to 30% of 23 that is a total sum of hit rates in the hit-rate tables, and thumbnail extraction criteria having a highest hit rate are scene shift detection and face detection, the scene shift detection and the face detection are set as the same priority. Accordingly, 8 candidate thumbnail images, from among 10 candidate thumbnail images in which a scene shift is detected and 10 candidate thumbnail images in which a face is detected, are determined as final thumbnail images. The processing unit 110 may take into account the number of faces, a size of a face, time intervals between candidate thumbnail images, or an evaluation value obtained by evaluating a scene shift, in order to determine final thumbnail images.

For example, the processing unit 110 may determine a candidate thumbnail image, in which a size of a face falls within a certain range, as a final thumbnail image as a first priority, determine a candidate thumbnail image in which an evaluation value obtained by evaluating a scene shift is equal to or greater than a reference value as a final thumbnail image as a second priority, and determine remaining final thumbnail images in an order of candidate thumbnail images in which at least one selected from a group consisting of a time interval with a previous candidate thumbnail image and a time interval with a next candidate thumbnail image is long.

Figures 11, 12:
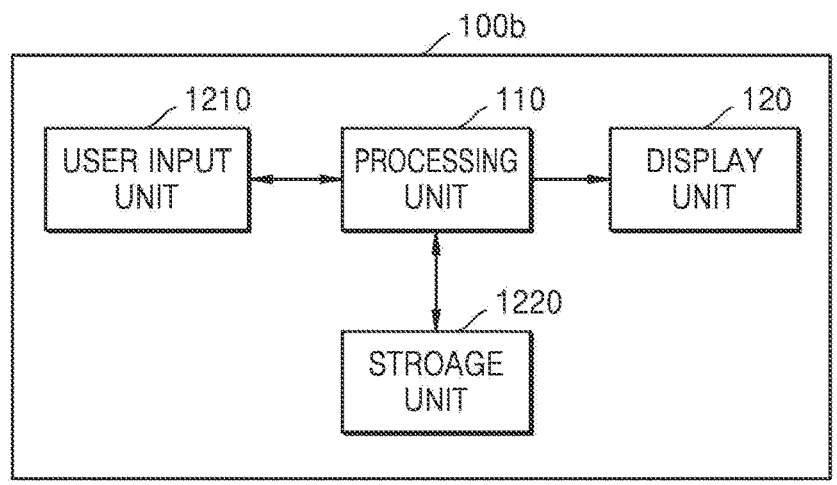
FIG. 11 illustrates a hit-rate table according to an embodiment of the present disclosure.
FIG. 12 illustrates a diagram of a structure of an electronic apparatus according to an embodiment of the present disclosure.

FIG. 11 illustrates a hit-rate table according to an embodiment of the present disclosure.

Referring to FIG. 11, a hit-rate table is illustrated, where the hit-rate table is generated with respect to moving-picture data having a time length equal to or greater than 30 minutes.

In FIG. 11, since a total sum of hit rates in the hit-rate table is 50 and the moving-picture data has a time length equal to or greater than 30 minutes, the number of final thumbnail images is determined as 5 obtained by applying 10% to 50. If the minimum number of thumbnail images is 10, since a value determined as 10% of 50 is less than the minimum number of the thumbnail images, the processing unit 110, as illustrated in FIG. 1, determines the number of the final thumbnail images as 10.

Since a hit rate corresponding to face detection 15 is equal to or less than 30% of 50 that is a total sum of hit rates in the hit-rate table, the processing unit 110 sets face recognition as a first priority and face detection as a second priority. Additionally, since a hit rate of scene shift detection is highest among hit rates, the processing unit 110 sets a scene shift detection as a third priority.

Then, the processing unit 110 determines a candidate thumbnail image corresponding to an initial scene and a candidate thumbnail image in which a registered face is recognized as final thumbnail images. Additionally, the processing unit 110 determines 5 candidate thumbnail images from among the candidate thumbnail images, in which a face is detected, as final thumbnail images.

FIG. 12 illustrates a diagram of a structure of an electronic apparatus according to an embodiment of the present disclosure.

Referring to FIG. 12, an electronic apparatus 100b is illustrated, where the electronic apparatus 100b includes a processing unit 110, a display unit 120, a user input unit 1210, and a storage unit 1220.

The processing unit 110 receives an input of moving-picture data, and determines at least one final thumbnail image based on the moving-picture data. The processing unit 110 extracts at least one candidate thumbnail image selected from a group consisting of a plurality of frames of the moving-picture data, by using a plurality of thumbnail extraction criteria. When the at least one candidate thumbnail image is determined, the processing unit 110 determines at least one final thumbnail image selected from a group consisting of the extracted at least one candidate thumbnail image, by taking into account a thumbnail extraction criterion to which the extracted at least one candidate thumbnail image corresponds.

In the current embodiment of the present disclosure, if a user input of selecting one from among the at least one final thumbnail image is detected, the processing unit 110 reproduces moving-picture data corresponding to the user input.

The display unit 120 displays the at least one final thumbnail image. The at least one final thumbnail image may be displayed on the display unit 120 in the form that may be selected by the user. For example, the at least one final thumbnail image may be displayed in a GUI form for playing a moving picture.

The user input unit 1210 receives a user input of selecting one from among the at least one final thumbnail image. The user input unit 120 may include, for example, a touchscreen, a touch pad, a touch sensor, and/or a key button.

The storage unit 1220 stores at least one piece of moving-picture data. Additionally, the storage unit 1220 stores at least one registered face. The storage unit 1220 may include, for example, a flash memory card, a secure digital (SD) card, a hard disk drive, or a solid-state disk (SSD), as a non-volatile memory.

Figure 13:
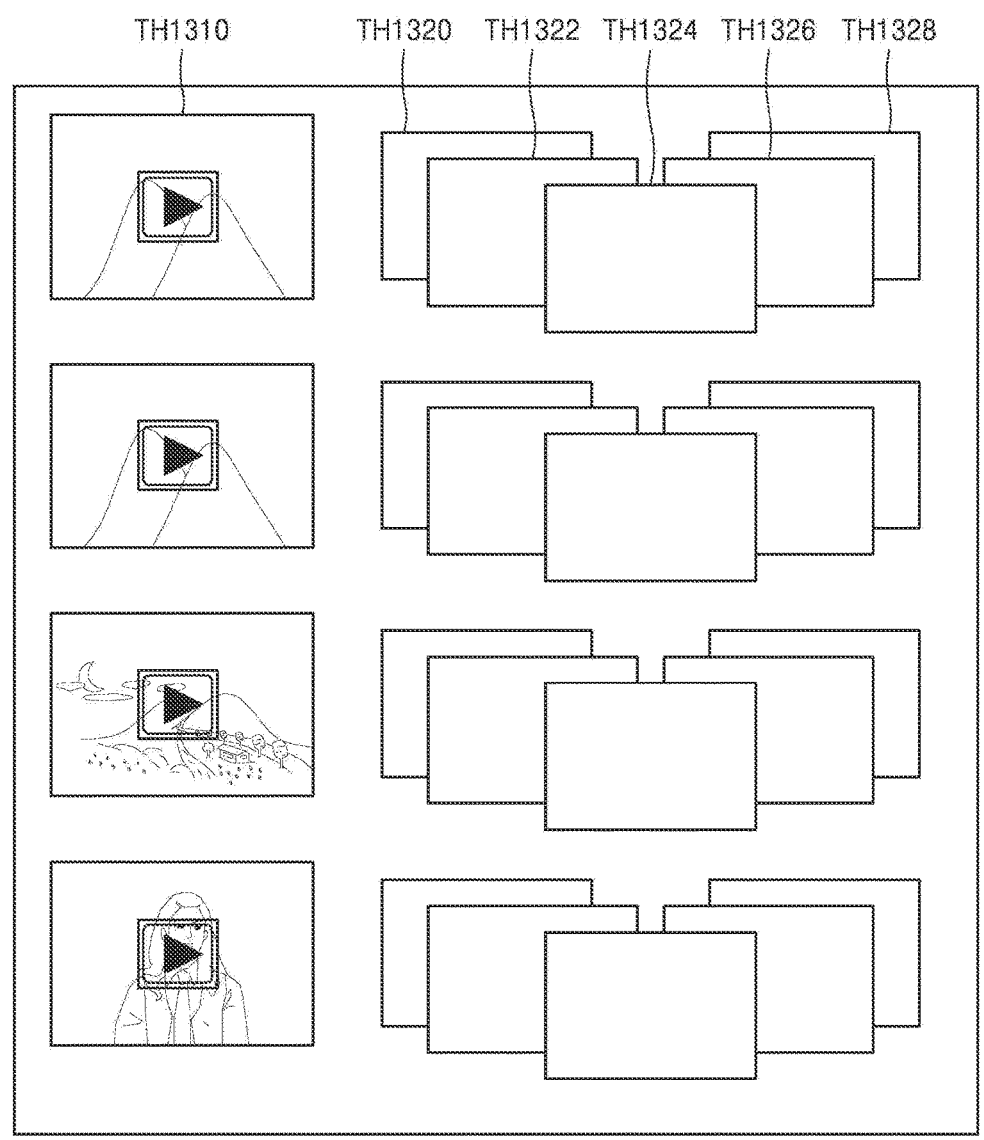
FIG. 13 illustrates a graphic user interface (GUI) screen for reproducing moving-picture data according to an embodiment of the present disclosure.

FIG. 13 illustrates a GUI screen for reproducing moving-picture data according to an embodiment of the present disclosure.

Referring to FIG. 13, the processing unit 110, as illustrated in FIG. 12, may separately display a final thumbnail image TH1310 corresponding to an initial scene on the display unit 120, as illustrated in FIG. 12, and display remaining final thumbnail images TH1320, TH1322, TH1324, TH1326, and TH1328 to overlap with each other. According to an embodiment of the present disclosure, a user may change a disposition of the remaining final thumbnail images TH1320, TH1322, TH1324, TH1326, and TH1328, by using a gesture input of selecting the final thumbnail images TH1320, TH1322, TH1324, TH1326, and TH1328.

For example, if a gesture input of touching and flicking the remaining final thumbnail images TH1320, TH1322, TH1324, TH1326, and TH1328 is performed, a screen, on which the remaining final thumbnail images TH1320, TH1322, TH1324, TH1326, and TH1328 are moved sideways, and thus, a disposition thereof is changed, may be displayed.

Figure 14:
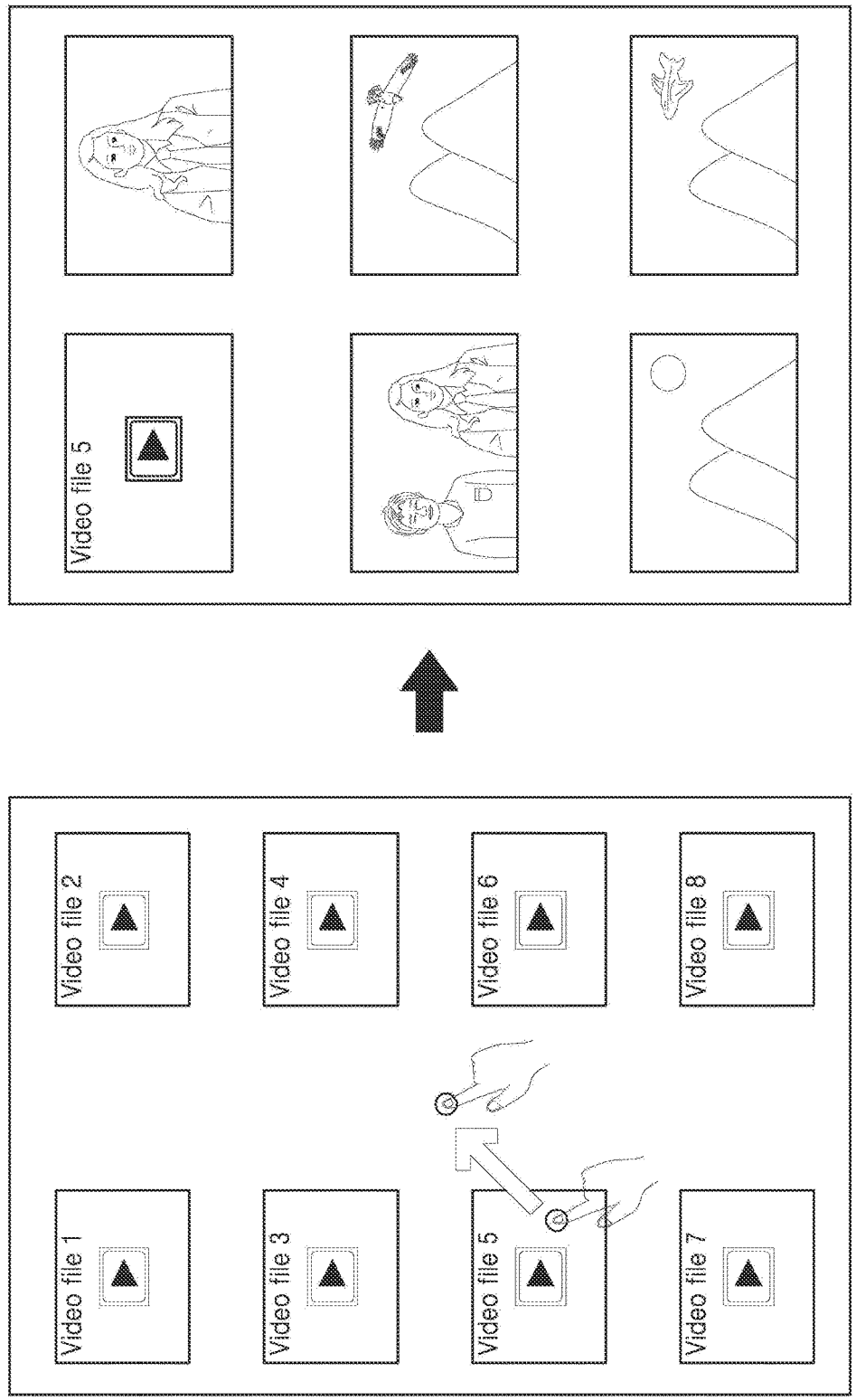
FIG. 14 illustrates a GUI screen for reproducing moving-picture data according to an embodiment of the present disclosure.

FIG. 14 illustrates a GUI screen for reproducing moving-picture data according to an embodiment of the present disclosure.

Referring to FIG. 14, the processing unit 110, as illustrated in FIG. 12, displays a final thumbnail image corresponding to an initial screen of each moving-picture data, and if a gesture input of selecting and dragging particular moving-picture data, such as video file 5 (of video files 1-8) to one side is detected, remaining final thumbnail images with respect to the selected moving-picture data, the video file 5, may be displayed on the display unit 120, as illustrated in FIG. 12.

Figure 15:
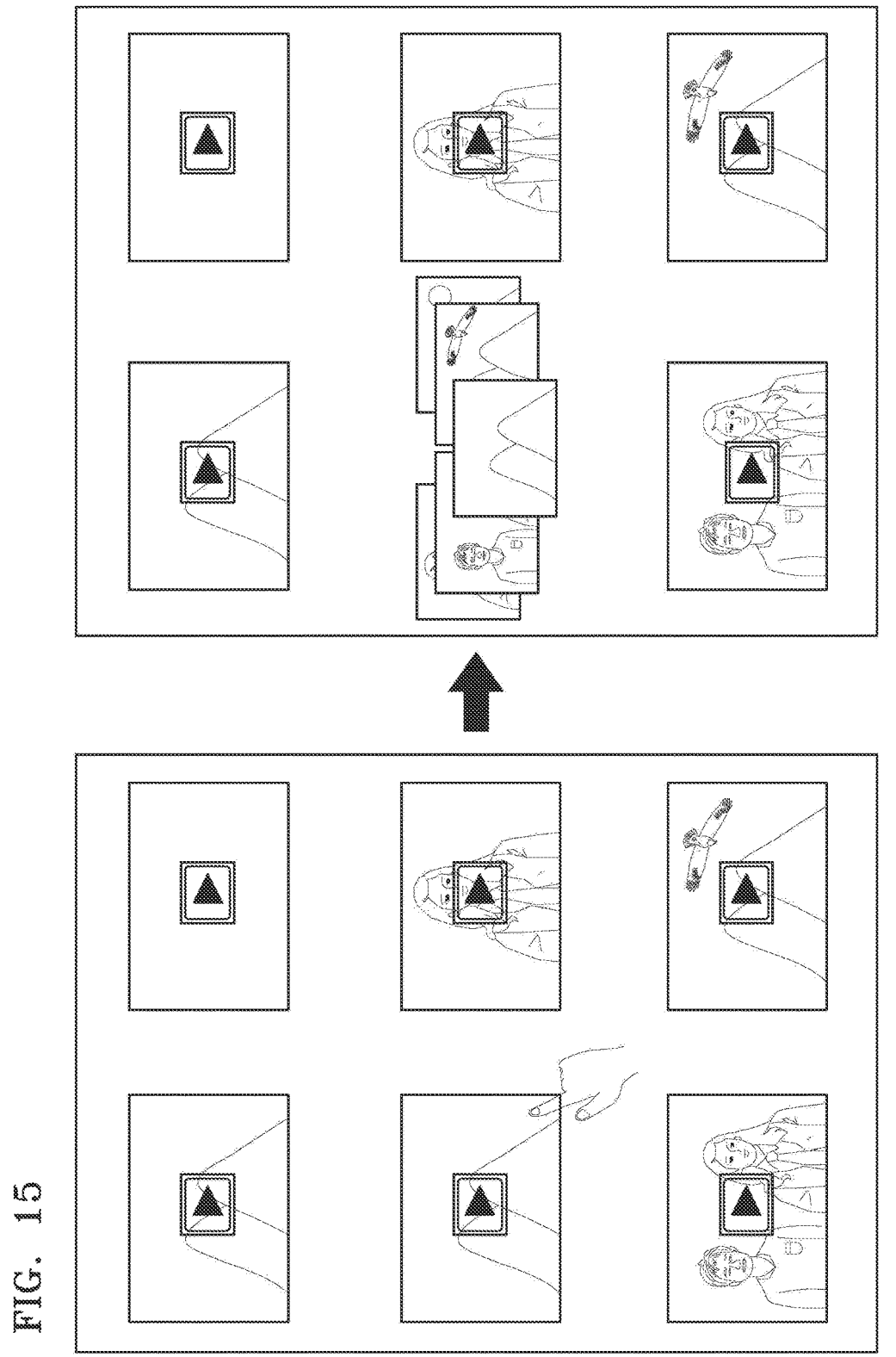
FIG. 15 illustrates a GUI screen for reproducing moving-picture data according to an embodiment of the present disclosure.

FIG. 15 illustrates a GUI screen for reproducing moving-picture data according to an embodiment of the present disclosure.

Referring to FIG. 15, the processing unit 110, as illustrated in FIG. 12, displays a final thumbnail image corresponding to an initial screen of each moving-picture data on the display 120, as illustrated in FIG. 12. Then, if a user input of selecting particular moving-picture data is detected, the processing unit 110 may display final thumbnail images with respect to the selected moving-picture data on the display unit 120. In the current embodiment, a user may change a disposition of the final thumbnail images, by using a gesture input of touching, and then, dragging the final thumbnail images with respect to the selected moving-picture data.

Figure 16:
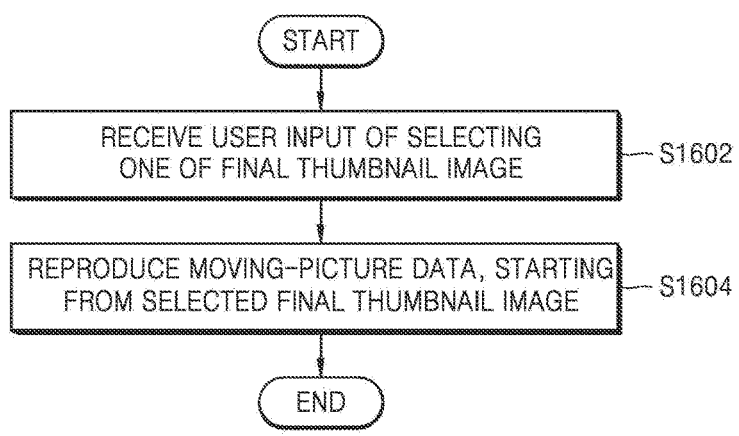
FIG. 16 is a flowchart of a method of reproducing moving-picture data according to an embodiment of the present disclosure.

FIG. 16 is a flowchart of a method of reproducing moving-picture data according to an embodiment of the present disclosure.

Referring to FIG. 16, a flowchart is illustrated, wherein, a user input of selecting one of final thumbnail images is received in operation S1602. Next, the processing unit 110, as illustrated in FIG. 12, reproduces and displays moving-picture data on the display unit 120 in operation S1604, and also starts the reproducing and the displaying from a frame corresponding to the selected final thumbnail image.

Figure 17:
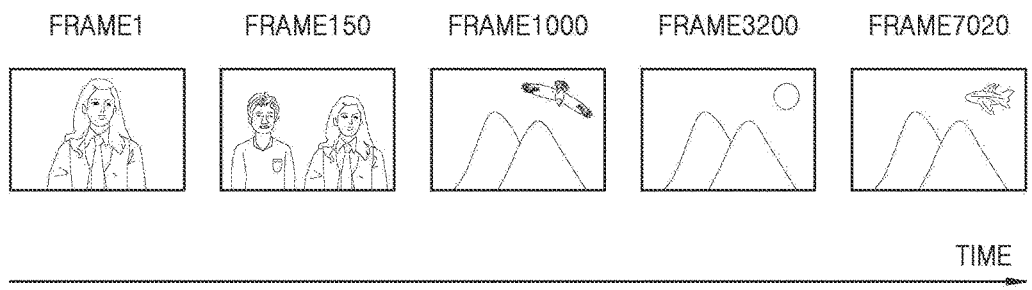
FIG. 17 illustrates a diagram for explaining a process of reproducing moving-picture data according to an embodiment of the present disclosure.

FIG. 17 illustrates a diagram for explaining a process of reproducing moving-picture data according to an embodiment of the present disclosure.

Referring to FIG. 17, FRAME 1, FRAME 150, FRAME 1000, FRAME 3200, and FRAME 7020 are illustrated, where each of the FRAMES is displayed as a final thumbnail image. Then, if a user selects FRAME 1000, the processing unit 110, as illustrated in FIG. 12, starts to reproduce moving-picture data from FRAME 1000. In the current embodiment, the electronic apparatus 100a, as illustrated in FIG. 1, or 100b, as illustrated in FIG. 12, may automatically provide at least one final thumbnail image, and start reproducing moving-picture data from a frame corresponding to a final thumbnail image selected by the user. Thus, a user may conveniently reproduce the moving-picture data from a main scene.

Figure 18:
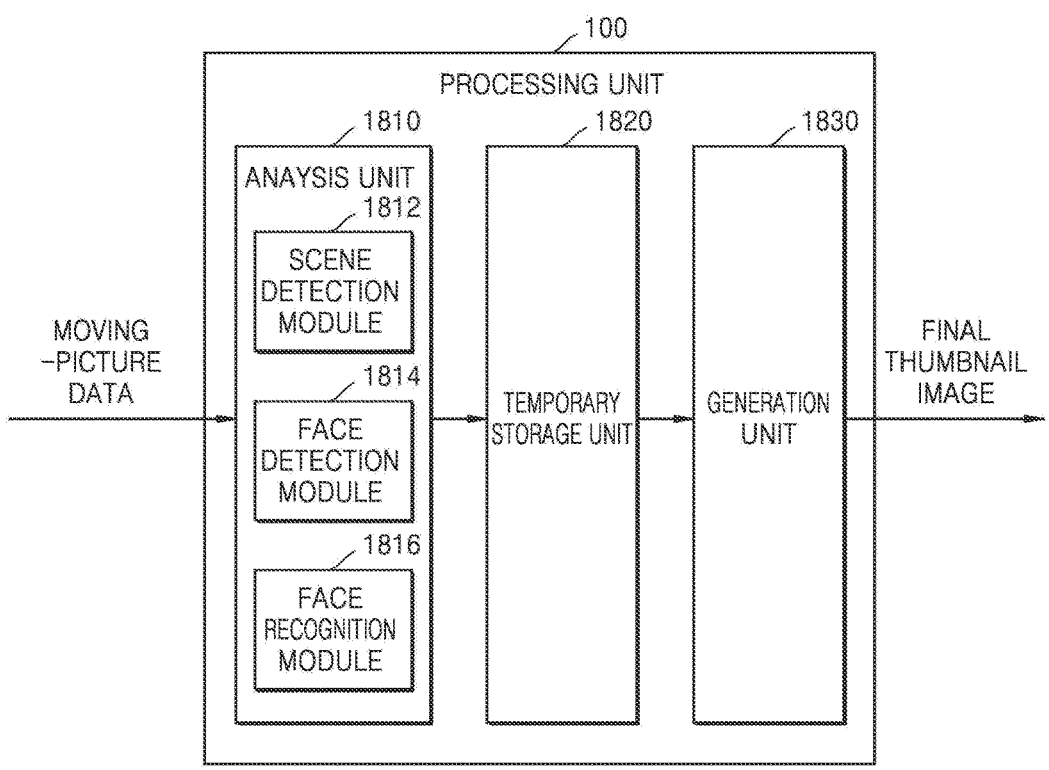
FIG. 18 illustrates a diagram of a structure of a processing unit according to an embodiment of the present disclosure.

FIG. 18 illustrates a diagram of a structure of a processing unit according to an embodiment of the present disclosure.

Referring to FIG. 18, a processing unit 110 is illustrated, where the processing unit 110 includes an analysis unit 1810, a temporary storage unit 1820, and a generation unit 1830.

If moving-picture data is input to the analysis unit 1810, the analysis unit 1810 determines whether a frame of the moving-picture data corresponds to a plurality of thumbnail extraction criteria. According to an embodiment of the present disclosure, the analysis unit 1810 may include a scene detection module 1812, a face detection module 1814, and a face recognition module 1816.

The scene detection module 1812 determines whether a scene shift is detected in a frame included in the moving-picture data. The face detection module 1814 determines whether a face is detected in a frame included in the moving-picture data. The face recognition module 1816 determines whether a registered face is recognized in a frame of the moving-picture data. The face recognition module 1810 determines a frame as a candidate thumbnail image if the scene detection module 1812, the face detection module 1814, and the face recognition module 1816 determine that the frame meets a thumbnail extraction criterion, and outputs the candidate thumbnail image to the temporary storage unit 1820.

According to an embodiment of the present disclosure, the analysis unit 1810 may output information about a thumbnail extraction criterion, to which each candidate thumbnail image corresponds, to the temporary storage unit 1820. Additionally, the analysis unit 1810 may generate and store a hit-rate table in the temporary storage unit 1820. Thus, whenever a candidate thumbnail image is detected, the analysis unit 1810 may update the hit-rate table.

The temporary storage unit 1820 stores candidate thumbnail images and a hit-rate table. The temporary storage unit 1820 may be a main memory of the electronic apparatus 100b, as illustrated in FIG. 12, and may be implemented in the form of a random-access memory (RAM) or a flash memory.

The generation unit 1830 determines a final thumbnail image from among candidate thumbnail images.

Figure 19:
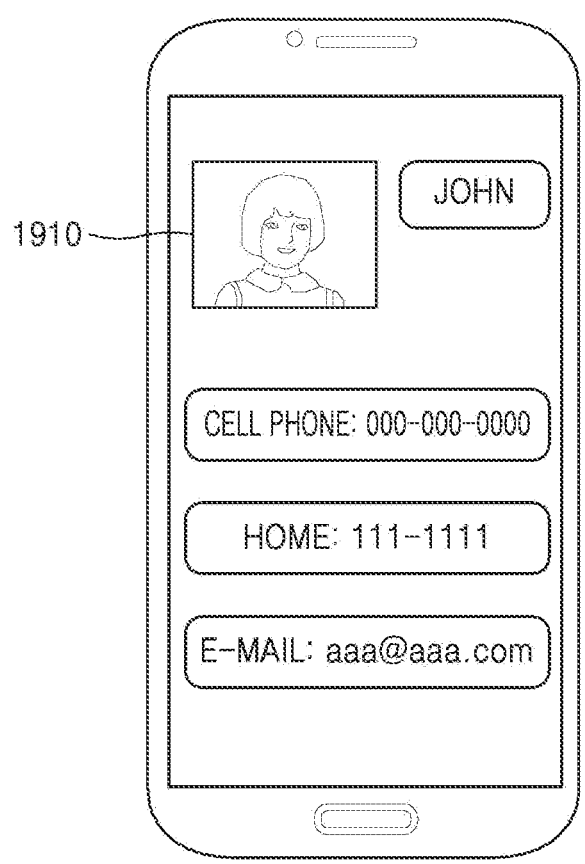
FIG. 19 illustrates a registered face according to an embodiment of the present disclosure.

FIG. 19 illustrates a registered face according to an embodiment of the present disclosure.

According to an embodiment of the present disclosure, a registered face may be a face image stored in an address book included in the electronic apparatus 100b, as illustrated in FIG. 12.

Referring to FIG. 19, a face image 1910 is illustrated, such that if the face image 1910 is registered for contact information, the face image 1910 registered for the contact information may be used as a registered face for face recognition.

Additionally, the registered face may include, for example, a face image pre-designated by a user, a profile image of a friend in a social network service (SNS), or a profile image of a friend in a messenger application.

FIG. 20 illustrates a diagram of a structure of an electronic apparatus according to an embodiment of the present disclosure.

Referring to FIG. 20, an electronic apparatus 100c is illustrated, where the electronic apparatus 100c includes a photographing unit 2010, an analog signal processing unit (e.g., an analog signal processor) 2020, a memory unit 2030, a storage/read control unit 2040, a data storage unit 2042, a program storage unit 2050, a display driving unit 2062, a display unit 2064, a central processing unit (CPU)/digital signal processor (DSP) 2070, and a manipulation unit 2080.

All operations of the electronic apparatus 100c are controlled by the CPU/DSP 2070. The CPU/DSP 2070 provides a control signal for controlling operations of each of a lens driving unit 2012, an iris driving unit 2015, and an imaging device control unit 2019, as included in the photographing unit 2010.

The photographing unit 2010 is a device for generating an image in response to an electrical signal due to incident light, and includes a lens 2011, the lens driving unit 2012, an iris 2013, the iris driving unit 2015, an imaging device 2018, and the imaging device control unit 2019.

The lens 2011 may include a plurality of lenses or groups of lenses. A location of the lens 2011 is adjusted by the lens driving unit 112. The lens driving unit 2012 adjusts the location of the lens 2011 according to a control signal provided by the CPU/DSP 2070.

A degree of opening and closing the iris 2013 is adjusted by the iris driving unit 2015. The iris 2013 adjusts an amount of light incident on the imaging device 2018.

An optical signal passing through the lens 2011 and the iris 2013 reaches a light-receiving surface of the imaging device 2018 and forms an image of a subject on the light-receiving surface of the imaging device 2018. The imaging device 2018 may be a charge-coupled device (CCD) image sensor or a complementary metal-oxide semiconductor image sensor (CIS) which converts an optical signal into an electrical signal. A sensitivity of the imaging device 2018 may be adjusted by the imaging device control unit 2019. The imaging device control unit 2019 may control the imaging device 2018 according to either a control signal which is automatically generated by an image signal input in real time or a control signal which is manually input by a user.

An exposure time of the imaging device 2018 is adjusted by a shutter (not illustrated). The shutter (not illustrated) may be a mechanical shutter which adjusts incidence of light by moving a screen or an electronic shutter which controls exposure by supplying an electrical signal to the imaging device 2018.

The analog signal processor 2020 performs noise reduction processing, gain control, waveform shaping, and analog-to-digital conversion processing on an analog signal supplied from the imaging device 2018.

A signal processed by the analog signal processor 2020 may be input to the CPU/DSP 2070 via the memory unit 2030 or directly without passing through the memory unit 2030. The memory unit 2030 operates as a main memory unit of the electronic apparatus 100c and temporarily stores information necessary during operation of the CPU/DSP 2070. The program storage unit 2050 stores programs such as an operating system for driving the electronic apparatus 100c, an application system, and the like.

The electronic apparatus 100c further includes the display unit 2064 for displaying an operation state of the electronic apparatus 100c or information regarding an image captured by the electronic apparatus 100. The display unit 2064 may provide a user with visual and/or audio information. The display unit 2064 may include, for example, a liquid crystal display (LCD) panel, an organic light-emitting display (OLED) panel, or the like, so as to provide visual information. Furthermore, the display unit 2064 may be a touchscreen which may recognize a touch input.

The display driving unit 2062 supplies a driving signal to the display unit 2064.

The CPU/DSP 2070 processes a received image signal and controls each constitutional unit of the electronic apparatus 100c according to the image signal or an external input signal. The CPU/DSP 2070 may reduce noise and perform image signal processing such as gamma correction, color filter array interpolation, color matrix, color correction, and color enhancement for the input image data, to improve image quality. In addition, the CPU/DSP 2070 may generate an image file by compressing image data which is obtained from image signal processing for image improvement, or may restore image data from the image file. Image compression may be reversible or irreversible. For example, a still image may be transformed into a joint photographic experts group (JPEG) format and/or a JPEG 2000 format. In a case of recording a moving picture, a moving picture file may be generated by compressing a plurality of frames in a format such as MPEG, HEVC, WMV, MOV, and/or ASF. An image file may be generated, for example, according to exchangeable image file format (Exif) standards.

Image data which is output from the CPU/DSP 2070 is input to the storage/read control unit 2040 directly or through the memory unit 2030. The storage/read control unit 2040 stores image data in the data storage unit 2042 automatically or according to a signal from a user. The storage/read control unit 2040 may also read image-related data from an image file stored in the data storage unit 2042 and may input the image-related data to the display driving unit 2062 via the memory unit 130 or another path so that the image may be displayed on the display unit 2064. The data storage unit 2042 may be detachably attached to or permanently mounted in the electronic apparatus 100c.

Additionally, the CPU/DSP 2070 may perform obscurity processing, color processing, blurring processing, edge emphasis processing, image interpretation processing, image recognition processing, image effect processing, or the like. The image recognition processing may include face recognition processing and scene recognition processing. Also, the CPU/DSP 2070 may perform processing of a display image signal to be displayed on the display unit 2064. For example, the CPD/DSP 2070 may perform brightness level adjustment, color correction, contrast control, edge enhancement adjustment, screen division processing, character image generation, and image synthesizing processing. The CPU/DSP 2070 may be connected to an external monitor and perform processing of a predetermined image signal to be displayed on the external monitor, and may transmit the processed image data to the external monitor so that the corresponding image is displayed on the external monitor.

The CPU/DSP 2070 may execute a program stored in the program storage unit 150 or include an additional module to generate a control signal for controlling auto-focusing, zooming, focusing, and automatic exposure (AE) compensation, thereby supplying the control signal to the iris driving unit 2015, the lens driving unit 2012, and the imaging device control unit 2019. Thus, the CPU/DSP 2070 may control all operations of elements of the electronic apparatus 100c such as a shutter and a strobo.

The manipulation unit 2080 is a device via which a user may input a control signal. The manipulation unit 2080 may include various function buttons such as a shutter-release button for inputting a shutter-release signal to expose the imaging device 2018 to light for a predetermined time for photographing, a power button for inputting a control signal to control a power ON or OFF, a zoom button for widening or narrowing a viewing angle according to an input, a mode selection button, and other buttons for adjusting photographing settings. The manipulation unit 2080 may be implemented in any form such as a button, a keyboard, a touchpad, a touchscreen, a remote control unit, and the like via which a user may input a control signal.

The processing unit shown in FIGS. 1 and 12 may correspond to the CPU/SDP 2070 shown in FIG. 20. The display unit 120 shown in FIGS. 1 and 12 may correspond to the CPU/SDP 2064 shown in FIG. 20. The user input unit 1210 shown in FIG. 12 may correspond to the manipulation unit 2080 shown in FIG. 20. The storage unit 1220 shown in FIG. 12 may correspond to the memory unit 2030 or the data storage unit 2042 shown in FIG. 20.

The electronic apparatus 100c shown in FIG. 20 is only an embodiment of the present disclosure. According to various embodiments of the present disclosure, the electronic apparatus 100c is not limited to the electronic 100c shown in FIG. 20.

As described above, according to the various embodiments of the present disclosure, a thumbnail image of moving-picture data may be provided.

Additionally, according to the various embodiments of the present disclosure, a user may conveniently reproduce a desired scene of moving-picture data.

In addition, other embodiments of the present disclosure can also be implemented through computer-readable code/instructions in/on a medium, e.g., a computer-readable medium, to control at least one processing element to implement any above-described embodiment of the present disclosure. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., read-only memory (ROM), floppy disks, hard disks, etc.) and optical recording media (e.g., compact disc-ROMs (CD-ROMs), or digital versatile discs (DVDs)), and transmission media such as Internet transmission media. Thus, the medium may be such a defined and measurable structure including or carrying a signal or information, such as a device carrying a bitstream according to various embodiments of the present disclosure. The media may also be a distributed network, so that the computer-readable code is stored/transferred and executed in a distributed fashion. Furthermore, the processing element could include a processor or a computer processor, and processing elements may be distributed and/or included in a single device. Also, functional programs, codes, and code segments for accomplishing the present disclosure can be easily construed by programmers skilled in the art to which the present disclosure pertains.

It should be understood that the various embodiments of the present disclosure described therein should be considered in a descriptive sense only and not for purposes of limitation. Descriptions of features or aspects within each embodiment of the present disclosure should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
   at least one processor configured to:
      extract at least one candidate thumbnail image from a plurality of frames of moving-picture data according to a plurality of thumbnail extraction criteria, and
      determine at least one final thumbnail image from the at least one candidate thumbnail image based on which of the plurality of thumbnail extraction criteria is used to extract each of the at least one candidate thumbnail image; and
   a display configured to display the at least one final thumbnail image,
   wherein the at least one processor is further configured to determine the at least one final thumbnail image by providing a first priority to a case when a registered face is recognized and providing a second priority to a case when a face is detected.

2. The electronic apparatus of claim 1, wherein the plurality of thumbnail extraction criteria further comprises a case when a scene shift, in which a scene is changed from a previous frame to a current frame in correspondence with a value equal to or greater than a reference value, is detected, the case when the face is detected, and the case when the registered face is recognized, or a combination thereof.

3. The electronic apparatus of claim 2, further comprising a memory configured to store at least one piece of contact information and a face image relating to the at least one piece of contact information,
   wherein the registered face comprises a face image related to the at least one piece of contact information.

4. The electronic apparatus of claim 2, wherein the case when the scene shift is detected comprises at least one selected from a group comprising a case when a change between frames corresponds to a value equal to or greater than the reference value, a case when a new object is detected, or a case when a photographing condition is changed in correspondence with the value equal to or greater than the reference value, or a combination thereof.

5. The electronic apparatus of claim 1, wherein the at least one processor is further configured to determine the at least one final thumbnail image by providing a third priority to a thumbnail extraction criterion to which a greatest number of the candidate thumbnail images obtained by the extracting correspond.

6. The electronic apparatus of claim 1, wherein the at least one processor is further configured to determine a number of the at least one final thumbnail image based on a time length of the moving-image data and a number of the at least one candidate thumbnail image obtained by the extracting.

7. The electronic apparatus of claim 1, wherein the at least one processor is further configured to determine that the at least one final thumbnail image includes an image corresponding to a first frame of the moving-picture data.

8. The electronic apparatus of claim 1,
   wherein the electronic apparatus further comprises:
      an interface configured to receive a user selection of selecting one of the displayed at least one final thumbnail image, and
   wherein the at least one processor is further configured to reproduce the moving-picture data, the reproducing of the moving-picture data starting from a frame corresponding to the selected at least one final thumbnail image, if the one of the displayed at least one final thumbnail image is selected.

9. The electronic apparatus of claim 1,
   wherein the electronic apparatus further comprises a memory configured to store the moving-picture data, and
   wherein the at least one processor is further configured to generate and store a moving-picture file that comprises the moving-picture data and the at least one final thumbnail image in the memory.

10. The electronic apparatus of claim 1, further comprising a memory configured to store a hit-rate table indicating a total sum of hit rates for each of a scene shift detection, a face detection, and a face recognition in relation to the moving-picture data.

11. An image processing method comprising:
    extracting, by at least one processor, at least one candidate thumbnail image from a plurality of frames of moving-picture data according to a plurality of thumbnail extraction criteria;
    determining, by the at least one processor, at least one final thumbnail image from the at least one candidate thumbnail image based on which of the plurality of thumbnail extraction criteria is used to extract each of the at least one candidate thumbnail image; and
    displaying the at least one final thumbnail image,
    wherein, in the determining of the at least one final thumbnail image, the at least one processor determines the at least one final thumbnail image by providing a first priority to a case when a registered face is recognized and providing a second priority to a case when a face is detected.

12. The image processing method of claim 11, wherein the plurality of thumbnail extraction criteria further comprises a case when a scene shift, in which a scene is changed from a previous frame to a current frame in correspondence with a value equal to or greater than a reference value, is detected, the case when the face is detected, and the case when the registered face is recognized, or a combination thereof.

13. The image processing method of claim 12, wherein the registered face comprises a face image that is related to and stored in contact information that is stored in an electronic apparatus for performing the image processing method.

14. The image processing method of claim 12, wherein the case when the scene shift is detected comprises at least one selected from a group comprising a case when a change between frames corresponds to a value equal to or greater than the reference value, a case when a new object is detected, or a case when a photographing condition is changed in correspondence with the value equal to or greater than the reference value, or a combination thereof.

15. The image processing method of claim 11, wherein, in the determining of the at least one final thumbnail image, the at least one processor determines the at least one final thumbnail image by providing a third priority to a thumbnail extraction criterion to which a greatest number of the candidate thumbnail images obtained by the extracting correspond.

16. The image processing method of claim 11, further comprising determining a number of the at least one final thumbnail image, based on a time length of the moving-image data and a number of the candidate thumbnail images obtained by the extracting.

17. The image processing method of claim 11, wherein the determining of the at least one final thumbnail image comprises determining that the at least one final thumbnail image includes an image corresponding to a first frame of the moving-picture data.

18. The image processing method of claim 11, further comprising reproducing the moving-picture data, the reproducing of the moving-picture data starting from a frame corresponding to the selected at least one final thumbnail image, if the one of the displayed at least one final thumbnail image is selected.

19. A non-transitory computer-readable storage medium storing instructions that, when executed, cause at least one processor to perform the method of claim 11.

* * * * *